(12) United States Patent
Jacob et al.

(10) Patent No.: US 10,746,907 B2
(45) Date of Patent: Aug. 18, 2020

(54) GRATING COUPLERS WITH CLADDING LAYER(S)

(71) Applicant: GLOBALFOUNDRIES INC., Grand Cayman (KY)

(72) Inventors: Ajey Poovannummoottil Jacob, Watervliet, NY (US); Yusheng Bian, Ballston Lake, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 199 days.

(21) Appl. No.: 15/945,347

(22) Filed: Apr. 4, 2018

(65) Prior Publication Data

US 2019/0310399 A1 Oct. 10, 2019

(51) Int. Cl.
*G02B 5/18* (2006.01)
*G02B 6/30* (2006.01)
*G02B 6/34* (2006.01)

(52) U.S. Cl.
CPC ............. *G02B 5/1847* (2013.01); *G02B 6/30* (2013.01); *G02B 6/34* (2013.01)

(58) Field of Classification Search
CPC ...... G02B 5/18; G02B 5/1814; G02B 5/1861; G02B 5/189; G02B 27/42; G02B 27/4233; G02B 27/4272; G02B 27/44; G02B 6/0011; G02B 6/0033; G02B 6/005; G02B 6/10; G02B 6/12; G02B 6/12002; G02B 6/12004; G02B 2006/12035; G02B 2006/12038; G02B 2006/12107; G02B 2006/12147; G02B 6/24; G02B 6/26; G02B 6/30; G02B 6/34

USPC ....... 359/558, 566, 569, 571, 572, 573, 574, 359/575, 576; 385/8, 9, 10, 14, 15, 31, 385/37, 39, 42, 49, 50
See application file for complete search history.

(56) References Cited

U.S. PATENT DOCUMENTS

| | | |
|---|---|---|
| 5,033,812 A | 7/1991 | Yoshida et al. |
| 5,101,459 A | 3/1992 | Sunagawa |
| 10,371,893 B2 * | 8/2019 | Yu ..................... G02B 6/12004 |
| 2002/0191916 A1 | 12/2002 | Frish et al. |
| 2004/0156589 A1 | 8/2004 | Gunn, III et al. |
| 2011/0133063 A1 | 6/2011 | Ji et al. |
| 2017/0047312 A1 | 2/2017 | Budd et al. |

OTHER PUBLICATIONS

Kehl et al., "Design of a Label-Free, Distributed Bragg Grating Resonator Based Dielectric Waveguide Biosensor", University of Zurich, Photonics, 2015, 16 pages.
Hitz, "Gratings Couple Optical Fibers to Silicon Photonic Devices", Photonics Spectra, Nov. 2005, 3 pages.
(Continued)

*Primary Examiner* — Arnel C Lavarias
(74) *Attorney, Agent, or Firm* — Francois Pagette; Andrew M. Calderon; Roberts Calderon Safran & Cole, P.C.

(57) ABSTRACT

The present disclosure relates to semiconductor structures and, more particularly, to grating couplers with structured cladding and methods of manufacture. A structure includes: a grating coupler in a dielectric material; a back end of line (BEOL) multilayer stack over the dielectric material; and a multi-layered cladding structure of alternating materials directly on the BEOL multilayer stack.

14 Claims, 4 Drawing Sheets

(56) References Cited

OTHER PUBLICATIONS

Dabos et al., "TM Grating Couplers for Low-Loss LPCVD based Si3N4 Waveguide Platform", Optics Communications 405 (2017) 35-38, CLEO: Science and Innovations 2017, 4 pages.
Sacher et al., "Wide bandwidth and high coupling efficiency Si3N4-on-SOI dual-level grating coupler", Optics Express, vol. 22, Issue 9, May 5 2014, 10 pages.

* cited by examiner

GRATING COUPLERS WITH CLADDING LAYER(S)

FIELD OF THE INVENTION

The present disclosure relates to semiconductor structures and, more particularly, to grating couplers with cladding layer(s) and methods of manufacture.

BACKGROUND

Grating couplers are commonly used in integrated optics for coupling light between integrated on-chip photonic waveguide structures and optical fibers. The grating couplers can couple light to and from the chip at any location, but the bandwidth can be limited due to the dispersive operating principle of the grating couplers.

Grating couplers can be formed in many different ways. For example, grating couplers can having a single-layer SiN top cladding (for products) or without the SiN cladding (used for wafer-level testing). Grating couplers with nitride top cladding suffer from limited coupling efficiency due to the additional reflection induced by the nitride cladding. The non-optimized top SiN top cladding will dramatically reduce the overall coupling efficiency of the photonic device.

SUMMARY

In an aspect of the disclosure, a structure comprises: a grating coupler in a dielectric material; a back end of line (BEOL) multilayer stack over the dielectric material; and a multi-layered cladding structure of alternating materials directly on the BEOL multilayer stack.

In an aspect of the disclosure, a structure comprises: a grating coupler in a dielectric material; a back end of line (BEOL) multilayer stack over the dielectric material; and a cladding layer directly on the BEOL multilayer stack, the cladding layer comprising a single material layer with a grating pattern.

In an aspect of the disclosure, a method comprises: forming a grating coupler in a dielectric material; forming a back end of line (BEOL) multilayer stack over the dielectric material; and forming a patterned layer of SiN material or a multi-layered cladding layer of alternating materials directly on the BEOL multilayer stack.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to grating couplers with a cladding layer(s) and methods of manufacture. More specifically, the present disclosure provides different cladding configurations to create destructive and/or constructive interference to improve efficiency of the grating couplers. Advantageously, using the different cladding configurations, the present disclosure provides high-efficiency tunable grating couplers, i.e., improved coupling efficiency of grating couplers (e.g., polysilicon, KG, nitride-based, etc. devices) for, amongst other devices, Si photonics technologies and other photonics technologies involving grating couplers.

In embodiments, the grating couplers described herein include, e.g., periodic/non-periodic gratings or multilayer "mesa" structures that create destructive or constructive interference for specific wavelengths of light emitted from a fiber optic, as an example. The periodic/non-periodic gratings or multilayer mesa structures can be SiN cladding on top of a back end of line (BEOL) stack. In embodiments, the SiN cladding is a single planar layer or multilayer stack with properly designed thicknesses and periodically/non-periodically gratings, e.g., patterned configurations, that minimize the reflection at the targeted wavelength range. The reduced reflection is achieved by fully leveraging the constructive/destructive interferences in the BEOL multilayer stack. The added SiN layer(s) naturally integrates with CMOS technology and other current technology platforms.

The grating couplers with the cladding layer(s) of the present disclosure can be manufactured in a number of ways using a number of different tools. In general, though, the methodologies and tools are used to form structures with dimensions in the micrometer and nanometer scale. The methodologies, i.e., technologies, employed to manufacture the grating couplers with the cladding layer(s) of the present disclosure have been adopted from integrated circuit (IC) technology. For example, the structures are built on wafers and are realized in films of material patterned by photolithographic processes on the top of a wafer. In particular, the fabrication of the grating couplers with the cladding layer(s) uses three basic building blocks: (i) deposition of thin films of material on a substrate, (ii) applying a patterned mask on top of the films by photolithographic imaging, and (iii) etching the films selectively to the mask.

Figure 1:
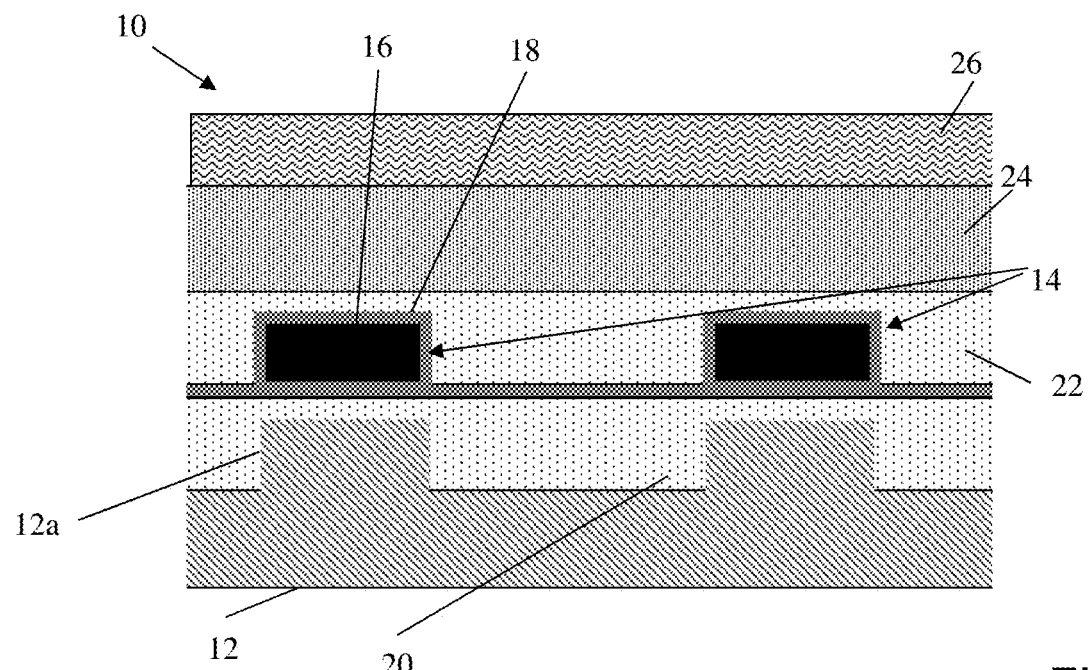
FIG. 1 shows a structure with a grating coupler and cladding and respective fabrication processes in accordance with aspects of the present disclosure.

FIG. 1 shows a structure with a grating coupler and cladding in accordance with aspects of the present disclosure. More specifically, the structure 10 of FIG. 1 is composed of a patterned semiconductor slab 12 positioned below a grating coupler 14. In embodiments, the pattern 12a of the semiconductor slab 12 is aligned with the grating coupler 14, which is composed of a patterned polysilicon material 16 and lined with a SiN material 18. In embodiments, the semiconductor slab 12 can be Si; although other semiconductor materials are also contemplated herein. For example, the semiconductor slab 12 can be composed of, but not limited to, Si, SiGe, SiGeC, SiC, GaAs, InAs, InP, and other III/V or II/VI compound semiconductors. The semiconductor slab 12 can also be part of a silicon on insulator (SOI) wafer, with each of the embodiments described herein including CMOS electronic components formed on or below the semiconductor slab 12 (or above the SOI wafer).

In embodiments, the semiconductor slab 12 and the polysilicon material 16 can be patterned by conventional lithography and etching methods known to those of skill in the art. For example, and referring to the patterning of the semiconductor slab 12, a resist formed over the semiconductor slab 12 is exposed to energy (light) to form a pattern (opening). An etching process with a selective chemistry, e.g., reactive ion etching (RIE), will be used to form one or more trenches partly within the semiconductor slab 12, e.g., to a certain desired depth, through the openings of the resist. The resist can then be removed by a conventional oxygen ashing process or other known stripants. A similar process is also used to pattern the polysilicon material 16 of the grating coupler 14.

Following resist removal over the patterned semiconductor slab 12, a dielectric material 20, e.g., oxide, is deposited on the patterned semiconductor slab 12. In embodiments, the dielectric material 20 can be deposited by a conventional deposition method, e.g., chemical vapor deposition (CVD) process. The polysilicon material 16 of the gating coupler 14 is then deposited over the dielectric material 20, e.g., using CVD processes, followed by the patterning process. Following the patterning of the polysilicon material 16, the SiN material 18 is deposited over the patterned polysilicon material 16 and the dielectric material 20. A dielectric material 22 is then deposited on the SiN layer 18, e.g., using CVD processes.

Still referring to FIG. 1, a back end of line (BEOL) multilayer stack 24 is formed over the dielectric material 22. The BEOL stack 24 can include any back end of line structures, e.g., wiring structures, interconnects, etc. A cladding layer 26 is formed on the BEOL stack 24. In embodiments, the cladding layer 26 can include one or more layers of patterned or non-patterned SiN material as described with respect to FIGS. 5A-5G. In this way, the cladding layer 26 can include different configurations in order to minimize the reflection at the targeted wavelength range and, hence, optimize the efficiency of the grating couplers. As should be understood by those of skill in the art, in operation, light from a fiber optic will be emitted through the cladding layer 26, BEOL stack 24, grating coupler 14 and semiconductor slab 12 into a waveguide structure (not shown).

Figure 2:
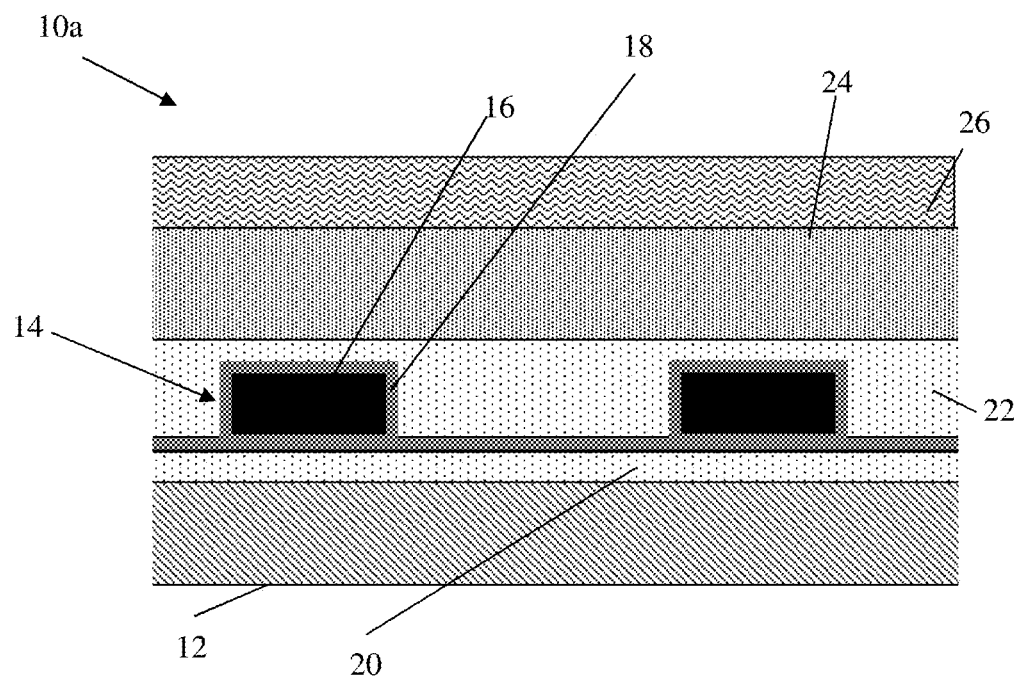
FIG. 2 shows a structure with a grating coupler and cladding and respective fabrication processes in accordance with additional aspects of the present disclosure.

FIG. 2 shows a structure with a grating coupler and cladding in accordance with another aspect of the present disclosure. In this embodiment, the structure 10a of FIG. 2 is composed of a non-patterned semiconductor slab 12 positioned below the grating coupler 14. As previously disclosed, the semiconductor slab 12 can be Si; although other semiconductor materials are also contemplated herein, e.g., SiGe, SiGeC, SiC, GaAs, InAs, InP, and other III/V or II/VI compound semiconductors. The semiconductor slab 12 can also be part of a SOI wafer.

As further shown in FIG. 2, the polysilicon material 16 of the grating coupler 14 is deposited on the dielectric material 20 and patterned by conventional lithography and etching methods known to those of skill in the art. Following the patterning of the polysilicon material 16, the SiN material 18 will be deposited over the dielectric material 20 and the patterned polysilicon material 16. The dielectric material 22 is deposited on the SiN material 18, e.g., using CVD processes, with the BEOL stack 24 formed over the dielectric material 22. The cladding layer 26 is formed on the BEOL stack 24. In embodiments, the cladding layer 26 can include any of the configurations shown in FIGS. 5A-5G.

Figure 3:
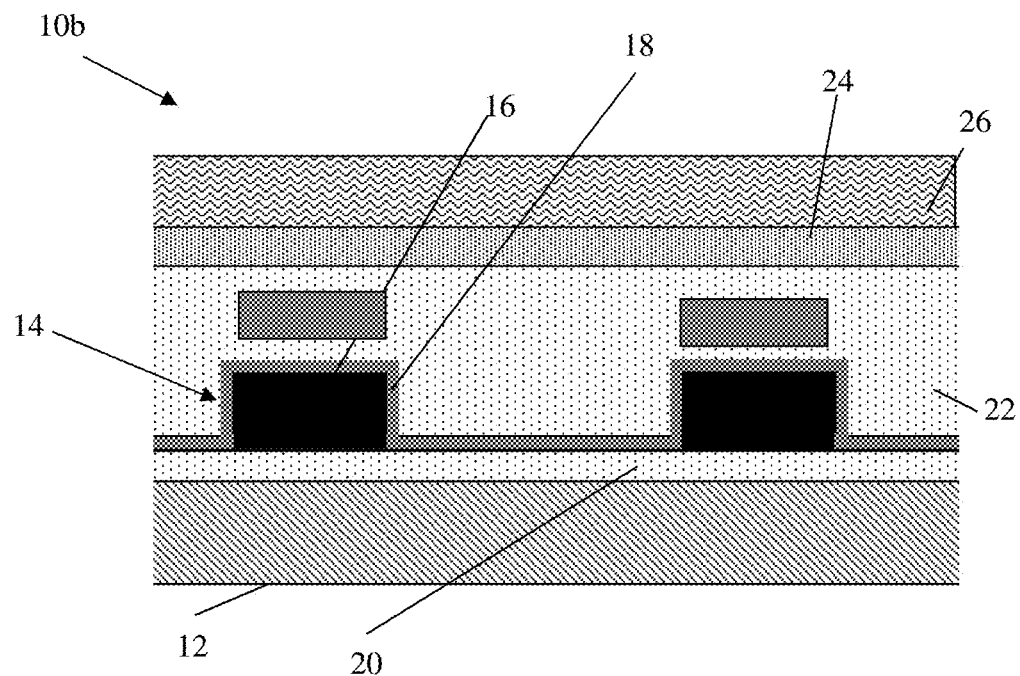
FIG. 3 shows a structure with a grating coupler and cladding and respective fabrication processes in accordance with additional aspects of the present disclosure.

FIG. 3 shows a structure with a grating coupler and cladding in accordance with another aspect of the present disclosure. In the embodiment of FIG. 3, the structure 10b includes a grating coupler 14a composed of patterned SiN material 28 formed in the dielectric material 22 and over the SiN material 18. The SiN material 28 is patterned using conventional lithography and etching processes as already described herein. In this embodiment, the dielectric material 20 is formed over SOI substrate 100.

Following the patterning of the SiN material 28, the dielectric material 22 is deposited on the grating coupler 14a, e.g., using CVD processes. The BEOL stack 24 is formed over the dielectric material 22, and the cladding layer 26 is formed on the BEOL stack 24. In embodiments, the cladding layer 26 can include any of the configurations shown in FIGS. 5A-5G. In this embodiment, as should be understood by those of skill in the art, light from a fiber optic will be emitted through the cladding layer 26, BEOL stack 24, grating coupler 14a and into a waveguide structure (not shown).

Figure 4:
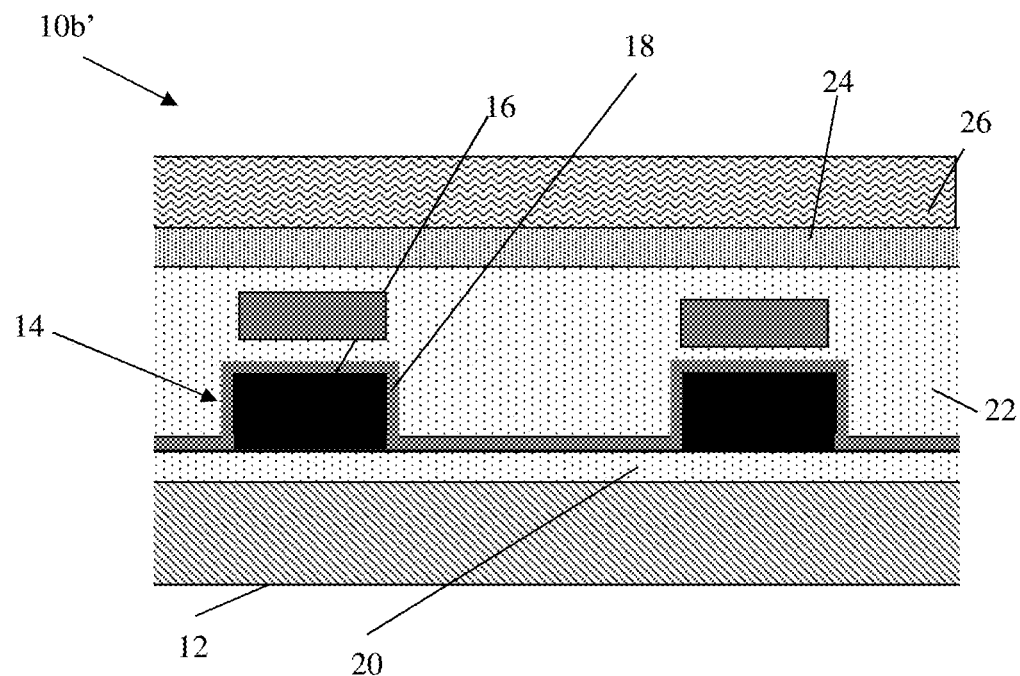
FIG. 4 shows a structure with a grating coupler and cladding and respective fabrication processes in accordance with additional aspects of the present disclosure.

FIG. 4 shows a structure with a grating coupler and cladding in accordance with yet another aspect of the present disclosure. In the embodiment of FIG. 4, the structure 10b' includes a grating coupler 14b composed of a partially patterned SiN material 28' formed in the dielectric material 22 and over the SiN material 18. In embodiments, the partially patterned SiN material 28' is subjected to an etching process to form trenches (of a certain desired depth) in the SiN material 28'. Similar to the structure of FIG. 3, the dielectric material 22 is deposited on the grating coupler 14b and the BEOL stack 24 is formed over the dielectric material 22. The cladding layer 26 is formed on the BEOL stack 24, as detailed in FIGS. 5A-5G.

FIGS. 5A-5G show different cladding configurations used with the grating couplers of FIGS. 1-4 and respective fabrication processes in accordance with aspects of the present disclosure. In the embodiments of FIGS. 5A-5G, each layer of material of the cladding can be deposited using conventional deposition methods, e.g., CVD, with the first layer, e.g., layer 110, deposited directed on the BEOL stack 24 of FIGS. 1-4. In addition, although each of the embodiments of FIGS. 5A-5E show a tri-layer configuration of alternating materials (e.g., SiN/oxide layers), it should be recognized by those of ordinary skill in the art that any multilayer configuration can be implemented comprising alternating layers (e.g., SiN/oxide layers), depending on the particular constructive or destructive interference required for a specific wavelength of light.

Figure 5A:
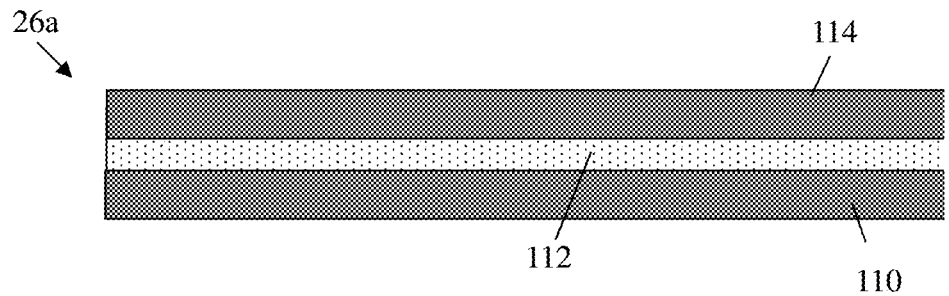
FIGS. 5A-5G show different cladding configurations used with the grating couplers of FIGS. 1-4 and respective fabrication processes in accordance with aspects of the present disclosure.

Specifically, in FIG. 5A, the cladding layer 26a includes a plurality of stacked layers of material 110, 112, 114. In embodiments, the first layer 110 is SiN material, the second layer 112 is dielectric material (e.g., oxide) deposited on the SiN material, and the third layer 114 is SiN material deposited on the dielectric material. In embodiments, the SiN layers 112, 114 can have a thickness in the range of about 100 nm to 3 μm; whereas, the dielectric material (e.g., oxide) 112 can have a thickness in the range of about 10 nm to 1 μm. It should be recognized, though, that the thicknesses of the layers, e.g., SiN/oxide, can be different for each layer, with the values preferably falling within the above-noted range depending on the particular constructive or destructive interference required for a specific wavelength of light.

Figure 5B:
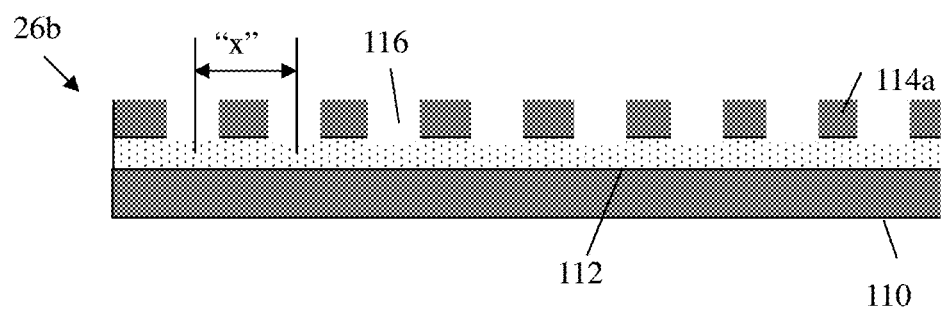

In FIG. 5B, the cladding layer 26b includes a plurality of stacked layers of material 110, 112, 114a. In embodiments, the first layer 110 is SiN material, the second layer 112 is dielectric material (e.g., oxide) deposited on the SiN material, and the third layer 114a is patterned SiN material on the dielectric material. In embodiments, the patterned SiN material 114a has a repetitive, periodic grating pattern. In this example, the dimensions of the spaces (groove) 116 can be about 300 nm to 20 μm, with the pitch "x" being about 500 nm to 40 μm.

Figure 5C:
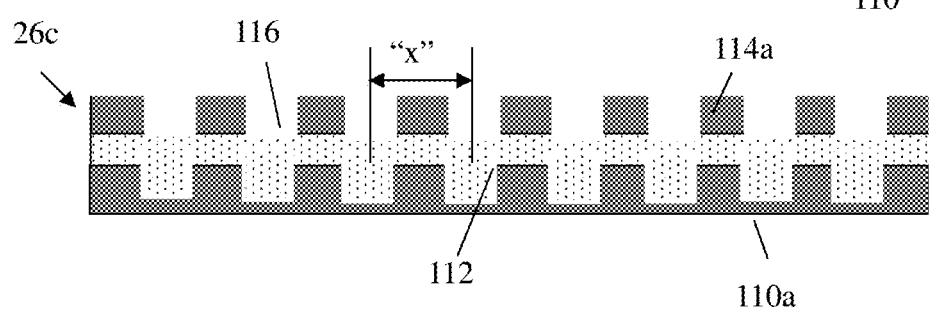

In FIG. 5C, the cladding layer 26c includes a plurality of stacked layers of material 110a, 112, 114a. In embodiments, the first layer 110a is patterned SiN material, the second layer 112 is dielectric material (e.g., oxide) deposited on the SiN material, and the third layer 114a is patterned SiN material deposited on the dielectric material. In embodiments, the patterned SiN material 110a, 114a each have a repetitive, periodic grating pattern. For example, the dimensions of the spaces (groove) 116 can be about 300 nm to 20 μm, with the pitch or period "x" being about 500 nm to 40 μm. In embodiments, the grooves 116 of each patterned layer 110a, 114a can either be aligned or offset (e.g., the period of the patterned layers 110a, 114a can be the same or different) depending on the particular constructive or destructive interference required for a specific wavelength of light.

Figure 5D:
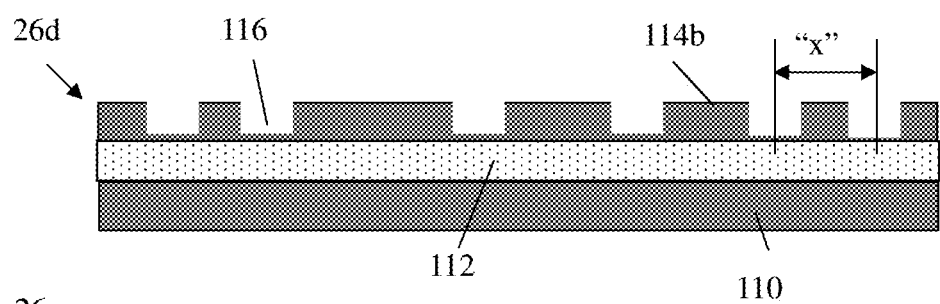

In FIG. 5D, the cladding layer 26d includes a plurality of stacked layers of material, 110, 112, 114b. In embodiments, the first layer 110 is SiN material, the second layer 112 is dielectric material (e.g., oxide) deposited on the SiN material, and the third layer 114b is patterned SiN material on the dielectric material. In embodiments, the patterned SiN material 114b has a non-periodic grating pattern. In this example, the dimensions of the spaces (groove) 116 can asymmetrical with the dimension of the grooves being different, e.g., about 300 nm to 20 μm, and the pitch or period "x" being between about 500 nm to 40 μm depending on location.

Figure 5E:
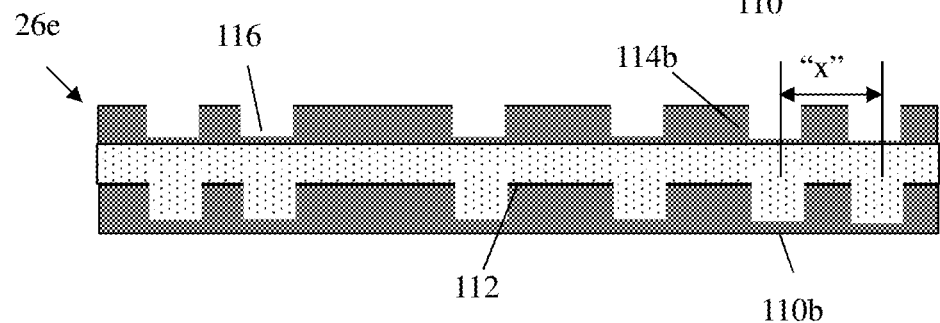

In FIG. 5E, the cladding layer 26e includes a plurality of stacked layers of material, 110b, 112, 114b. In embodiments, the first layer 110b is patterned SiN material, the second layer 112 is dielectric material (e.g., oxide) deposited on the SiN material, and the third layer 114b is patterned SiN material deposited on the dielectric material. In this example, though, the patterned SiN materials 110b, 114b each have a non-periodic grating pattern as noted, for example, with respect to FIG. 5D. Also, in embodiments, the grooves 116 of each patterned material 110b, 114b can either be aligned or offset (e.g., the period of the patterned layers 110b, 114b can be the same or different) depending on the particular constructive or destructive interference required for a specific wavelength of light.

Figure 5F:
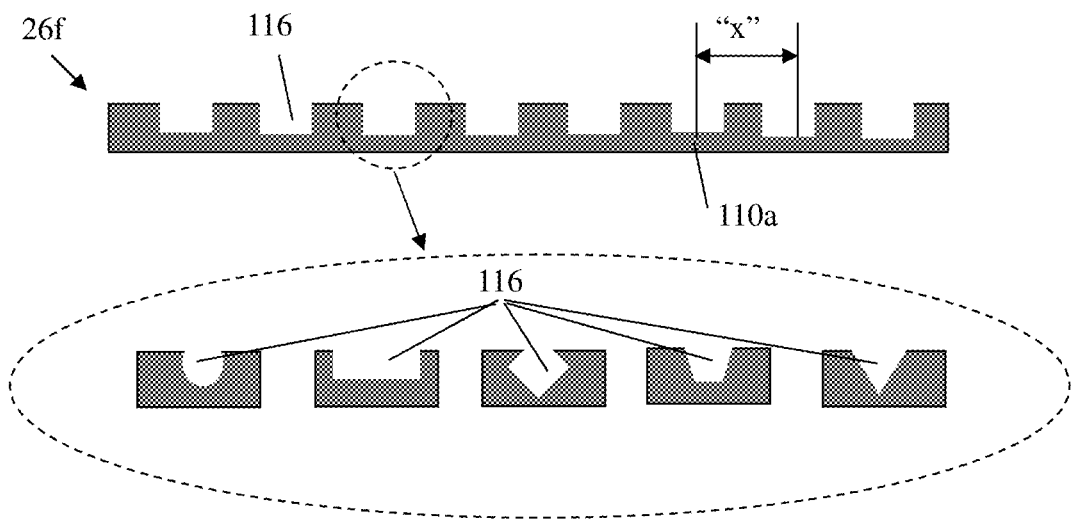

In FIG. 5F, the cladding layer 26f includes a single layer of material 110a of patterned SiN material (e.g., mesa structures). In this example, the patterned SiN material 110a has a periodic grating pattern as noted, for example, with respect to FIGS. 5B and 5C. In this and each of the other patterned embodiments (e.g., FIGS. 5B-5G), the grooves 116 can be different shapes including, e.g., trapezoid, inverse trapezoidal, triangle, semispherical, diamond, parallelogram, square, etc., as shown in the exploded inset of FIG. 5F. The thickness of the single material layer 110a can be about 20 nm to 2.98 μm. In this example, the dimensions of the spaces (groove) 116 are, e.g., about 300 nm to 20 μm, with the pitch or period "x" being about 500 nm to 40 μm.

Figure 5G:
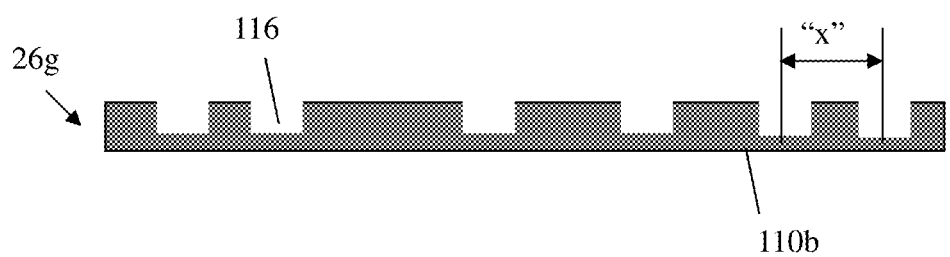

In FIG. 5G, the cladding layer 26g includes a single layer of material 110b of patterned SiN material (e.g., mesa structures). In this example, the patterned SiN material 110b has a non-periodic grating pattern as noted, for example, with respect to FIGS. 5D and 5E. The thickness of the single material layer 110b can be about 20 nm to 2.98 μm. In this example, the dimensions of the spaces (groove) 116 can be asymmetrical with a distance between adjacent grooves being different, e.g., about 300 nm to 20 μm, and the pitch or period "x" being about 500 nm to 40 μm.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
a grating coupler in a dielectric material;
a back end of line (BEOL) multilayer stack over the dielectric material; and
a multi-layered cladding structure of alternating materials directly on the BEOL multilayer stack.

2. The structure of claim 1, wherein the alternating materials comprises at least a tri-layer configuration of a lower SiN material directly on the BEOL stack, oxide material and an upper SiN material.

3. The structure of claim 2, wherein the upper SiN material has a periodic grating pattern.

4. The structure of claim 2, wherein the upper SiN material has a non-periodic grating pattern.

5. The structure of claim 2, wherein the lower SiN material has a periodic grating pattern.

6. The structure of claim 2, wherein the lower SiN material has a non-periodic grating pattern.

7. The structure of claim 2, wherein the lower SiN material includes a grating pattern which is aligned with a grating pattern of the upper SiN material.

8. The structure of claim 2, wherein the lower SiN material has a grating patterned which is non-aligned with a grating pattern of the upper SiN material.

9. The structure of claim 1, wherein at least one of alternating materials comprises a grating pattern comprising a groove having a shape of one of square, diamond, trapezoid, inverse trapezoidal, semi-spherical, and parallelogram.

10. A method comprising:
forming a grating coupler in a dielectric material;
forming a back end of line (BEOL) multilayer stack over the dielectric material; and
forming a multi-layered cladding layer of alternating materials directly on the BEOL multilayer stack.

11. The method of claim 10, wherein the SiN material and/or the upper SiN material is patterned with a periodic grating pattern, after depositing of the SiN material directly on the BEOL multilayer.

12. The method of claim 10, wherein the alternating materials are SiN material deposited directly on the BEOL multilayer stack, an oxide material deposited on the SiN material, and an upper SiN material deposited on the oxide material.

13. The method of claim 12, wherein the upper SiN material is patterned with a grating pattern.

14. The method of claim 13, wherein the SiN material is patterned with a grating pattern.

* * * * *